Jan. 21, 1930.  F. E. GOUGH  1,744,542
INTERNAL COMBUSTION ENGINE
Filed June 27, 1929   3 Sheets-Sheet 1

INVENTOR.
FRANK E. GOUGH,
BY Shepherd Campbell
ATTORNEYS

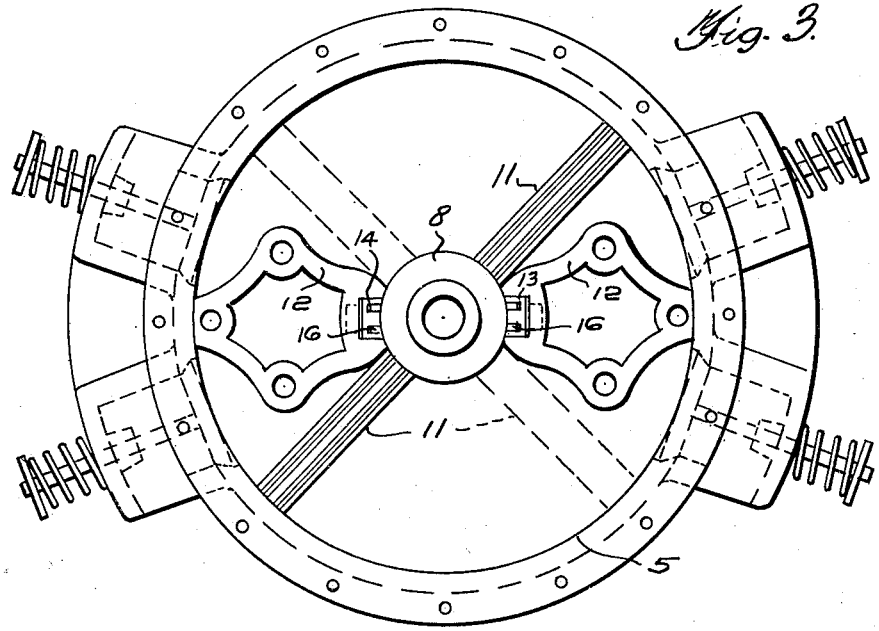
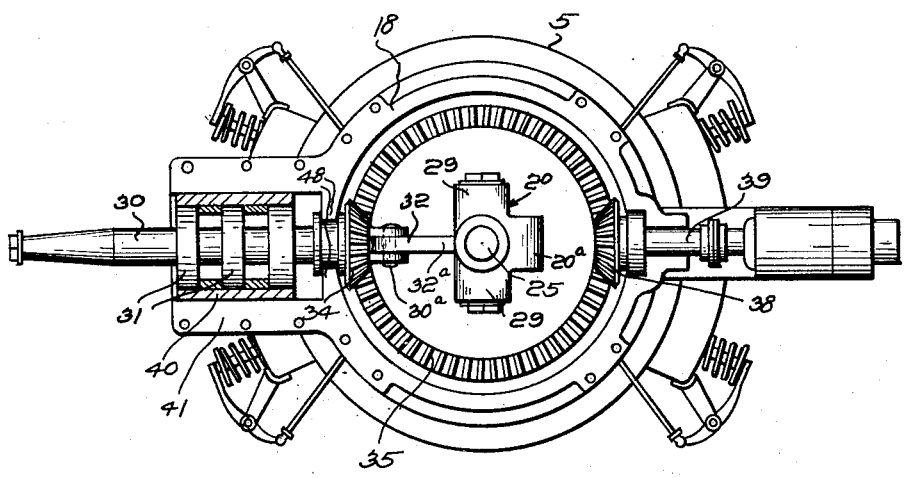

Jan. 21, 1930.   F. E. GOUGH   1,744,542
INTERNAL COMBUSTION ENGINE
Filed June 27, 1929   3 Sheets-Sheet 3

INVENTOR.
FRANK E. GOUGH,
BY Shephard Campbell
ATTORNEYS

Patented Jan. 21, 1930

1,744,542

UNITED STATES PATENT OFFICE

FRANK E. GOUGH, OF OKLAHOMA CITY, OKLAHOMA, ASSIGNOR TO GOUGH AIRCRAFT CORPORATION, A CORPORATION OF OKLAHOMA

INTERNAL-COMBUSTION ENGINE

Application filed June 27, 1929. Serial No. 374,228.

This invention relates to internal combustion engines of the character of that shown in my Patent No. 1,737,082, Nov. 26, 1929, of which the present application is a continuation in part.

Like the aforesaid patent, the device of the present invention has for its primary object the production of an internal combustion engine of the oscillatory type, constructed in such manner as to yield the maximum efficiency in operation in proportion to the weight of the engine, and, while primarily intended for aviation use, it is, of course, not limited to that field.

In common with the aforesaid patent, the device of the present invention aims to provide an engine which permits variation of compression to meet the conditions existing at any given moment.

It is a well known fact that, while internal combustion engines operating at high compression yield the maximum output of power, in proportion to the fuel consumed, they are hard to start and are easily stalled. That is to say, a low compression engine will operate much more satisfactorily at low piston speeds than a high compression engine. It is, therefore, desirable to render it possible to vary the compression ratio, or piston clearance, at will. Since internal combustion engines used for aviation purposes are frequently called upon to function at high altitudes, it follows that they are frequently operating in rarified atmosphere, and that the amount of fuel drawn into the cylinders is correspondingly less than would be the case if the engine were operating at ordinary sea level pressure. The engine of the present invention is so designed that the same adjustment that decreases the piston clearance increases the piston travel, with the result that simultaneously with the increase of compression, I secure a marked increase in the amount of fuel drawn in to be compressed.

It is a further object of the invention to accomplish the foregoing highly desirable and advantageous results through the medium of a mechanism of extreme simplicity and light weight and one that will yield an even and steady output of power.

A further object of the invention is to provide an engine of the character described of extremely long life, and one in which means are provided for compensating for wear between the various working surfaces, so that it will not be necessary to dismantle the engine for frequent re-adjustment and repair.

The present application is devoted to claiming the power take-off and those features of the power take-off, by virtue of which I am able to secure, in a facile, economical and efficient way, the desired variation in compression by a simple adjustment of the elements of the power take-off.

While my object in designing the parts in the manner illustrated has been to secure the desired mechanical functioning, it is a fact that the arrangement shown provides a very strong and rugged construction, and one that is adapted to stand up under severe operating conditions over extended periods of time without appreciable wear or deterioration.

Further objects and advantages of the invention will be set forth in the detailed description which follows.

In the accompanying drawings.

Figure 5:
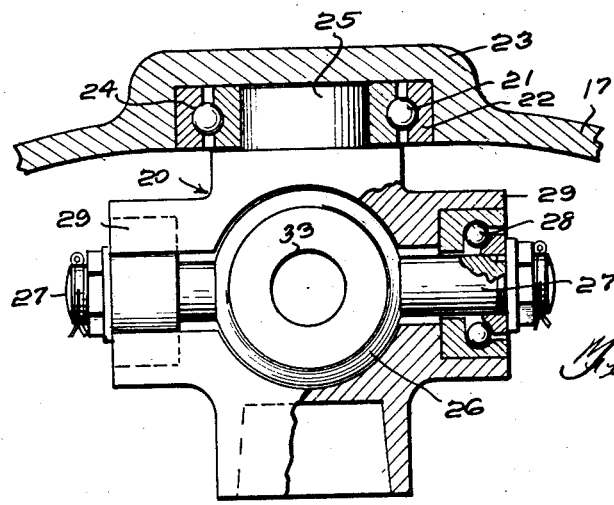
Figures 6, 7:
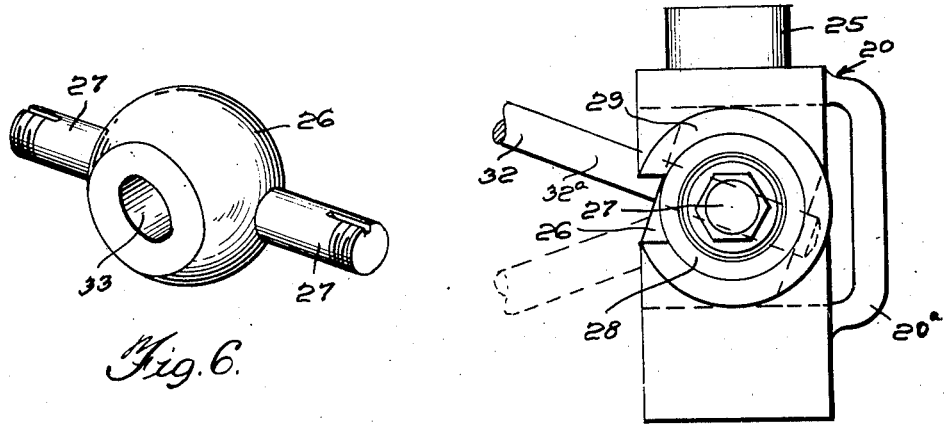
Figure 8:
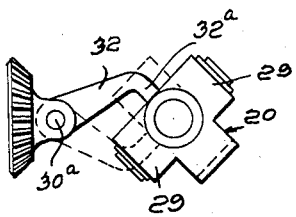

Fig. 3 is a plan view with the upper cylinder heads and associated parts removed, Fig. 4 is a plan view of the engine with the removable cap of the upper cylinder head removed, Fig. 5 is a transverse sectional view through the universal connection between the piston shaft and the main drive shaft of the engine, Fig. 6 is a perspective view of an element of universal joint, hereinafter described, Fig. 7 is a side elevation of said universal joint, including the yoke constituting a part of the same, and Fig. 8 is a plan view of the universal joint showing it in extreme position at one limit of movement, in full lines, and in extreme position at its other limit of movement in dotted lines.

Like numerals designate corresponding parts in all of the figures of the drawings.

Figure 1:
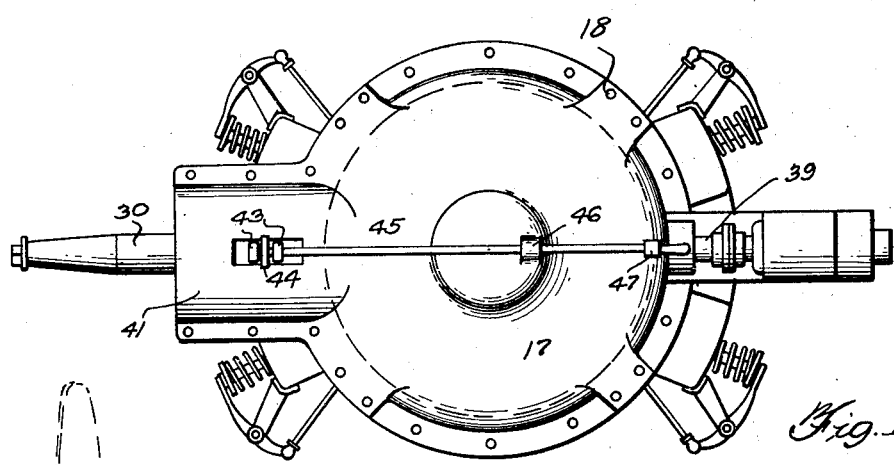
Fig. 1 is a plan view of the engine.
Figure 2:
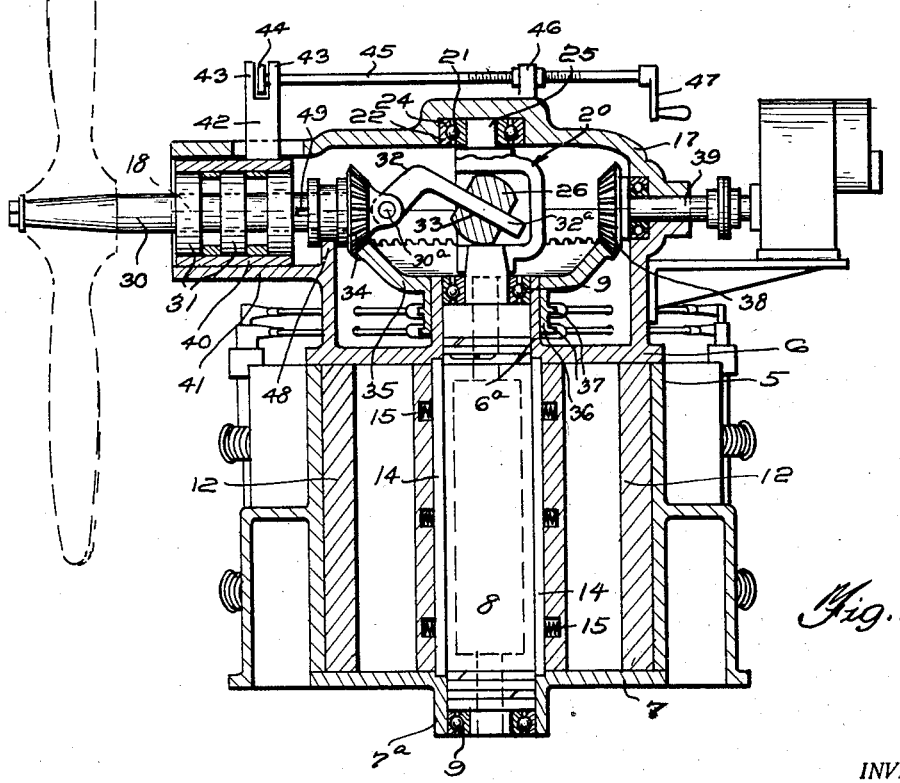
Fig. 2 is a vertical sectional view therethrough.

Like the engine of my aforesaid patent, the engine of the present application comprises a cylinder 5, having an upper head 6, and a lower head 7. A hollow shaft 8 is mounted by means of anti-friction bearings 9, in the hubs 6ª—7ª of the upper and lower cylinder heads, respectively. The shaft 8 is an oscillatory one, and it carries radially disposed pistons or vanes 11, which move from the full to the dotted line position illustrated in Fig. 2. Abutments 12 extend from cylinder head 6 to the cylinder head 7, and from the inner periphery of the cylinder 5 to the outer periphery of the shaft 8. Master packing strips 13 are mounted in channels 14, of the inner faces of the abutments, and are spring pressed toward shaft 8. by springs 15. In addition, auxiliary smaller packing strips 16 are mounted in the master packing strips and are spring pressed against the periphery of the shaft by small flat springs 16ª, in a manner common in the packing art. However, the particular way of packing the moving parts against leakage is no part of the present invention, since claims to these features are being made the subject matter of another application, and since it is apparent that other ways may be resorted to, of suitably packing these elements.

Further, no description of the valve mechanism is included in this present application, since the valves and the operating mechanism therefor are disclosed in my patent aforesaid, the present application being devoted, as hereinbefore stated, to the power take-off and variable compression features inherent therein. The oscillatory shaft 8 is extended at its upper end into the interior of a cap 17, which is secured along the line 18, to the cup-like upper cylinder head 6. In this cup, the shaft 8 carries a yoke 20. A ball bearing 21 on the top of this yoke has its fixed element 22 seated in a boss 23 of the cap 17, the balls 21 engaging in a raceway 24, of an upwardly extending projection 25, of the yoke. A universal block 26 carries the oppositely extending trunnions 27 and these trunnions are journaled by means of the antifriction ball bearings 28, in the side extensions 29 of the yoke.

It will be observed that the yoke is closed at its rear side, or at 20ª, to provide an element that connects the lower portion of the yoke with the upper portion thereof, but that it is open at its forward side or at the side that faces toward the driven shaft 30. This shaft may be the propeller shaft of an aeroplane, or any other piece of mechanism. The shaft 30 is journaled in a plurality of anti-friction bearings 31, which may be of any number and may extend for any suitable distance along the shaft 30, in order to give the desired elongation to the bearing surface. The shaft 30 has its rear end shaped to constitute a crank 32, the extremity of which passes through a central opening 33, formed in the universal block 26.

It will be observed that the portion of the crank which extends through the opening 33 lies at an acute angle with respect to the axial line of the shaft 30.

It is apparent that as the shaft 30 rotates, the working run 32ª of the crank continually changes its direction. Changes of direction in the vertical plane are accommodated by the capability of the block 33 to turn upon the trunnions 27, in the anti-friction bearings 28, while changes of direction in the horizontal plane are accommodated by the oscillation of the main piston shaft 8, about its axis. The shaft 30 carries a gear 34 through which rotation is imparted to the gear 35 that is journaled upon the hub 6ª. The gear 35, in turn, is provided with a hub extension 36, which carries valve operating cams 37 in the manner described in my aforesaid patent, and constituting no part of this present invention. However, it may be stated that in practice the gear 35 has double the number of teeth of gear 34. The gear 35, in turn, drives a pinion 38, that is secured upon a magneto shaft 39. The magneto supplies the necessary current to the spark plugs of the engine in a manner well known in the art.

The anti-friction bearings 31 of the driven shaft 30, are carried by a sleeve 40, that is slidably mounted in the bearing extension 41, of the cylinder head 6 and the cap 17. An extension 42 of the sleeve is provided with ears 43, which lie upon the opposite sides of a collar 44, said collar being carried by a rod 45, which has threaded engagement in an ear 46. The rod is provided with a crank handle 47, and it is clear that rotation of the rod will cause it to travel endwise and adjust the sleeve 40 inwardly or outwardly, as the case may be, said sleeve carrying with it the shaft 30 and its bearings. This causes the working extension 32ª of the crank to project into the universal block 26 to a greater or lesser degree, as the case may be, and, consequently, varies the degree of oscillation of the shaft 8, and thus varies the extent to which the pistons 11 will approach the abutments 12. The gear 34 is provided with a grooved hub, and is held against endwise movement with the shaft 30, by the engagement of a tongue or flange 48 of the bearing extension 41 in the groove of said hub, while, at the same time, said gear is caused to turn with the shaft by being splined thereon, as indicated at 49. The crank extension 32—32ª of the shaft 30 is pivotally connected to the remainder of the shaft at 30ª, which facilitates the variable compression adjustment hereinbefore described.

In operation, oscillation of the shaft 8, under the influence of the pistons 11, imparts rotation to the driven shaft 30 through the universal connection established between the piston shaft and driven shaft by the angularly disposed working run 32ª of the driven shaft and the universal block 26.

It will be observed that all of these parts are of rugged construction, and that they are suitably journaled in anti-friction bearings, so that the movement of the parts is effected with the expenditure of a minimum amount of power.

It will be clear that variation in the piston throw, with a corresponding decrease in piston clearance, will result in an increase in the amount of fuel that will be drawn into the combustion chamber at each cycle of operation, and that this will be accompanied by a corresponding increase in compression.

It will be understood that in effecting rotation of the shaft 30, the crank 32 passes over the top of the axis of said shaft as the yoke 20 moves in one direction, and passes under the axis of the shaft 30, under the influence of the yoke 20, as the said yoke moves in the opposite direction.

It will be clear that the principle involved is largely the same as that embodied in the take-off mechanism of my aforesaid patent. Consequently, it is to be understood that the invention is not limited to the precise construction set forth, but that, upon the contrary, the claims of this application are intended to cover both broadly and specifically the power take-off mechanism, the aforesaid patent being devoted to the novel type of abutment and overlapping valve therein described, together with such complete claims to the whole combination as define structures embodying said abutments.

Having described my invention, what I claim is:

1. An engine of the character described, comprising a cylinder, an oscillatory shaft mounted therein, a rotative driven shaft outside the cylinder constituting the power shaft of the engine and being disposed substantially at right angles to the oscillatory shaft, a crank extension carried by the power shaft and lying at an acute angle with relation thereto, and a universal joint connection between said crank extension and the oscillatory shaft of the engine, as and for the purposes set forth.

2. A structure as recited in claim 1, in combination with means for adjusting the position of the said crank with respect to the said universal joint to vary the degree of throw permitted the oscillatory shaft to each rotation of the driven shaft.

3. An engine of the character described, comprising a cylinder, an oscillatory shaft mounted therein, a yoke carried by the oscillatory shaft, a universal block trunnioned in the yoke, a power shaft, and a crank extension carried by the power shaft and projecting into the universal block.

4. A structure as recited in claim 3, wherein the crank extension is pivotally connected to the said power shaft.

5. A structure as recited in claim 3, in combination with means for bodily adjusting the power shaft toward and from the universal block to cause the crank extension to project thereinto to a greater or lesser degree.

6. A structure as recited in claim 3, in combination with bearings in which the power shaft is mounted, a carrier for said bearings, and means for adjusting the carrier, bearings and shaft bodily inward and outward, said means being controllable from the exterior of the engine.

7. A structure as recited in claim 3, in combination with bearings carried by the power shaft, a carrier for said bearings, and a screw engaged with said carrier for bodily adjusting said carrier with the bearings, as and for the purposes set forth.

8. A structure as recited in claim 3, in combination with a plurality of bearings for the power shaft, a common carrier for all of said bearings, a screw and element into which said screw is threaded, means for manually operating said screw, and a connection between the screw and the carrier, the turning of the screw serving to effect bodily adjustment of the carrier and bearings, as and for the purposes set forth.

9. An engine of the character described, comprising a cylinder, an oscillatory shaft therein, a cup-like head for the cylinder, a cap fitted upon the top of said cup-like head, a yoke carried by the oscillatory shaft and located within the cup-like head, an anti-friction bearing between the top of the yoke and the said cap, a universal block trunnioned in the yoke by anti-friction bearings and having an opening therethrough, a power shaft and a crank extension carried by the power shaft and lying at an acute angle with relation thereto, and engaging in the opening of the block.

10. A structure as recited in claim 9, in combination with means for bodily adjusting the power shaft toward and from the trunnion block to move said crank extension into and out of said trunnion block, and thereby vary the throw of the oscillatory shaft for each revolution of the power shaft.

11. A structure as recited in claim 9, wherein the crank extension is pivotally connected to the power shaft.

12. An engine of the character described, comprising a cylinder, an oscillatory shaft mounted therein, a rotative driven shaft outside of the cylinder and constituting the power shaft of the engine and being disposed substantially at right angles thereto, a crank arm carried by the power shaft and lying at an acute angle with relation to said power shaft, a universal block trunnioned in the yoke in which the crank extension of the power shaft is engaged, a gear wheel mounted for rotation about the axis of the oscillatory shaft and beneath said yoke, and a gear wheel splined upon the power shaft outwardly of the said crank extension and meshing with the first named gear wheel, means for holding said last named gear wheel against movement axially of the power shaft, and means for adjusting the power shaft axially.

In testimony whereof I affix my signature.

FRANK E. GOUGH.